(12) United States Patent
Kablaoui (10) Patent No.: US 10,185,316 B2
(45) Date of Patent: Jan. 22, 2019

(54) SYSTEM AND METHOD FOR DRONE CONNECTIVITY AND COMMUNICATION OVER A CELLULAR NETWORK

(71) Applicant: Edward Kablaoui, Columbia, MD (US)

(72) Inventor: Edward Kablaoui, Columbia, MD (US)

( * ) Notice: Subject to any disclaimer, the term of this patent is extended or adjusted under 35 U.S.C. 154(b) by 0 days.

(21) Appl. No.: 15/233,429

(22) Filed: Aug. 10, 2016

(65) Prior Publication Data

US 2017/0045884 A1 Feb. 16, 2017

Related U.S. Application Data

(60) Provisional application No. 62/203,058, filed on Aug. 10, 2015.

(51) Int. Cl.
| | |
|---|---|
| *G05D 1/00* | (2006.01) |
| *B64C 39/02* | (2006.01) |
| *G01S 5/02* | (2010.01) |
| *H04L 29/08* | (2006.01) |
| *H04L 29/06* | (2006.01) |
| *G01S 5/00* | (2006.01) |
| *G01S 19/14* | (2010.01) |

(52) U.S. Cl.
CPC ......... *G05D 1/0022* (2013.01); *B64C 39/024* (2013.01); *G01S 5/0027* (2013.01); *H04L 65/4069* (2013.01); *H04L 67/10* (2013.01); *H04L 67/12* (2013.01); *G01S 19/14* (2013.01)

(58) Field of Classification Search
CPC ... G05D 1/0022; H04L 67/12; H04L 65/4069; H04L 67/10; G01S 5/0027; G01S 19/14; B64C 39/024
See application file for complete search history.

(56) References Cited

U.S. PATENT DOCUMENTS

| | | | |
|---|---|---|---|
| 9,563,201 B1* | 2/2017 | Tofte .................... | G05D 1/0038 |
| 9,599,994 B1* | 3/2017 | Bogdanowicz ........ | G05D 1/104 |
| 2006/0102798 A1* | 5/2006 | Cox .......................... | B64C 1/26 |
| | | | 244/190 |
| 2014/0032034 A1* | 1/2014 | Raptopoulos ........ | G08G 5/0069 |
| | | | 701/25 |
| 2014/0254896 A1* | 9/2014 | Zhou ...................... | B25J 9/0006 |
| | | | 382/124 |

(Continued)

*Primary Examiner* — Rodney A Butler (57) ABSTRACT

Disclosed herein is a system and method for drone connectivity using cellular networks for out of line-of-sight applications and tracking drones during flight. The present invention may be modular, allowing users to program customizable modes for one or more microprocessors of the system. In one embodiment, a system comprises a drone configured with a processor, a cellular modem and a flight controller, the processor connected to the cellular modem and connected to the flight controller via serial connections; a cloud server; a remote control device, and wherein the system is configured for communication from the remote control device to the cloud server via internet communication, and from the cloud server to the drone via a cellular network in communication with the cloud server and the cellular modem, the system providing a communication network for the delivery and routing of data between the remote control device and the drone.

4 Claims, 5 Drawing Sheets

(56) References Cited

U.S. PATENT DOCUMENTS

| | | | |
|---|---|---|---|
| 2015/0134143 A1* | 5/2015 | Willenborg | G05D 1/0094 701/2 |
| 2015/0147976 A1* | 5/2015 | Wang | G05D 1/0022 455/65 |
| 2016/0117932 A1* | 4/2016 | Park | G01S 19/39 701/3 |
| 2016/0144959 A1* | 5/2016 | Meffert | B64C 39/024 701/3 |
| 2016/0214715 A1* | 7/2016 | Meffert | B64C 39/024 |
| 2016/0240087 A1* | 8/2016 | Kube | G08G 5/006 |
| 2017/0010611 A1* | 1/2017 | Tao | G06F 3/14 |
| 2017/0064498 A1* | 3/2017 | Manges | H04W 4/02 |
| 2018/0004201 A1* | 1/2018 | Zach | G05D 1/0022 |

* cited by examiner

SYSTEM AND METHOD FOR DRONE CONNECTIVITY AND COMMUNICATION OVER A CELLULAR NETWORK

CROSS REFERENCE TO RELATED APPLICATIONS

This application claims the benefit of U.S. provisional patent application No. 62/203,058 filed on Aug. 10, 2015, the contents of which are hereby incorporated by reference in their entirely.

BACKGROUND

Drones are currently operated by a remote and RF transmitter such as the 9XR Turnigy controller and Fr Sky transmitter or similar models. These remotes work using an RF frequency transmitter employing Pulse Width Modulation (PWM). Pulse Code Modulation (PCM) or some other analog waveform processing. These methods usually limit the number of channels to 6 or 8, where for example, one channel controls the throttle and another controls the yaw and etc. One issue is the transmitters' limited range and susceptibility to RF interference, such as from a cell tower, which can result in loss of control of the drone. Both the data sent and received from the drone is very limited due to the small number of channels supported. Any large amount of data recorded by sensors on the drone can only be processed once the drone lands and the data is downloaded to a computer for processing since there is no way to stream large amounts of data back to the operator in real-time. These controllers also allow drone operators to fly in restricted areas unless these areas are pre-programmed on the drone at the time of flight. Even then these areas need to be updated on the drone on a continual bases and there is no current method to enforce this.

SUMMARY

Disclosed herein is a system and method for drone connectivity using cellular networks for out of line-of-sight applications and configured for tracking of drones as well as setting of dynamic waypoints during flight. The present invention may be modular, thereby allowing users to program customizable modes and connect custom hardware to one or more microprocessors of the system. The present invention also provides a solution for government agencies to monitor drone activity for commercial and private use.

Drones are currently controlled using line of sight RF communications. The present invention allows the control of drones as well as the sending and receiving of telemetry data using cellular networks. The present invention allows flight controls and the sending/receiving of telemetry data from drones that are not in line of sight and cannot receive local RF communications.

In one embodiment of the invention, a system, comprises a drone configured with a processor, a cellular modem and a flight controller, the processor connected to the cellular modem and separately connected to the flight controller via serial connections; a cloud server; a remote control device configured with an end user interface, and wherein the system is configured for communication from the remote control device to the cloud server via internet communication, and from the cloud server to the drone via a cellular network in communication with the cloud server and the cellular modem, and wherein the system provides a communication network for the delivery and routing of data, including messages, instructions for drone operation, packets or other data, between the remote control device and the drone.

In another embodiment, the system includes a camera attached to the drone and in connection with the processing board, the system configured to transmit images or video stream from the camera to a display or monitor of an end user device using video compression techniques. In yet another embodiment, the system comprises a monitoring device, configured with a drone device URL, and wherein the monitoring device is in communication over a wireless network to the cloud server for monitoring of drone activity by an end user via the monitoring device, wherein the monitoring device comprising a portable electronic device including a smartphone, a tablet, a desktop or laptop computing device, the device configured with input and output means.

In one embodiment, a device comprises a drone configured with a plurality of propellers, a processor board attached to a portion of the drone and configured with a plurality of USB ports, a cellular modem attached to the drone and connected via a USB serial connection to processor board, the modem configured for communication on a cellular network to a web service configured to receive data from the processing board, a GPS mechanism attached to drone body and connected to the processor board through a serial connection configured for communication to a cloud server comprising a web service configured to receive GPS data, and a flight controller connected to the processing board via a USB (serial) connection. In another embodiment, the device comprises the drone configured to receive data, including messages, packets and instructions to be carried out by processing board, from a remote control device, wherein the remote control device is a portable electronic device (smart phone, tablet, laptop) configured with an end user interface to communicate with a cloud server comprising a web service, and to send instructions for controlling or monitoring the operation of the drone. In yet another embodiment, a camera for recording photos or video is connected by a serial connection to the processor board, and wherein video or photos can be send from the device to a destination over a cellular network via the cellular modem of the device.

In one embodiment, a method for remote connectivity and communication with a drone beyond line-of-sight via a portable electronic device, the method comprises sending a message comprising a drone UID from a drone configured with a processing board, a flight controller and a cellular modem, the flight controller and cellular modem connected by serial connection to the processing board to a cloud server wherein the message is sent via a cellular network from the drone to the cloud server; receiving the message from the drone via the cellular network to a drone port on the cloud server; registering the drone ID of the message in a registry table on a drone database on the server; assigning a drone ID to a portable electronic device configured as a remote control device comprising an end user interface and configured for communication with the cloud server, thereby creating a remote control to drone connection assignment; storing the connection assignment in a remote control/end user table in the registry database; routing messages received at the cloud server from the remote control to the assigned drone, the message sent from the cloud server via an internet connection to a cell tower; transmitting the routed message received from the cloud server to the assigned drone over a cellular network, whereby the message is received on the drone via the cellular modem; and transmitting data comprising images, video stream gps coordinates, or commands from the drone to the cloud server over a cellular network. In another embodiment, the method further comprises assigning to a drone, a URL designated for the drone on a web service of the cloud server, the server configured for connection over a wireless network to a monitoring device, thereby establishing a connection for remote monitoring of drone activity and drone data via the monitoring device. In yet another embodiment, the method utilized one or more application (software) modules stored on one or both of the remote control device or the web server database, for remote monitoring and connectivity with the assigned drone of the remote control device. Examples include a monitoring module; an encryption module; a security module; a user interface module; a flight operation module. It is envisioned that the remote control device comprise a portable electronic device such as a smartphone, a tablet, a laptop, a desktop, or other computing device that is configured with one or more of the application/software modules.

In another embodiment, disclosed are non-transitory computer-readable medium having recorded thereon one or more programs that causes a processor to execute a method for connecting a drone to one or both of a cloud server and web service in turn connected to a drone configured with a processing board, flight controller and cellular modem, for communication and connectivity with the drone in order to send and receive data from the drone via the web service, the method according to the processes described herein.

DETAILED DESCRIPTION OF THE INVENTION

As used herein, drone refers to an unmanned aerial vehicle (UAV) with a plurality of propellers, a motor, and configured to operate by some form of flight control system, such as an autopilot mode, or by use of a remote control device in communication with the UAV.

As used herein, TCP stands for Transmission Control Protocol and in context of the invention, guarantees that data packets reach their destination.

As used herein, UDP stands for User Datagram Protocol and in context of the invention, does not guarantee that a data packet will arrive at its destination.

There are presently no known products on the market that allow drones to communicate beyond the line of sight using communication via cellular networks. By using Cellular networks and the methods described herein the problem of losing control of a drone due to range or RF interference is greatly reduced. The system is no longer limited to a small number of channels since the messages sent are digital and can be very complex data structures. Not only does this allow more precise control of the drone, but also a much larger number of "channels". The data structures received can also be used to control complex sensors and hardware mounted to the drone. This method also allows sensors and hardware to stream complex data back to the user in real-time such as video. This method also allows data be streamed real-time to multiple recipients such as filming a sporting event using drones. The hardware for controlling the drone is no longer specialized but is now software running on a phone, tablet PC or any other device connected to the internet through either a service provider or cellular network. This system also allows for continual monitoring of drone traffic, one single database for no fly zones, dynamic creation of no-fly zones while drones are in flight, the ability to take control of a drone if it enters a restricted area, the ability to force all drones on the network to land such as in the case of a national emergency. Even though this is currently not allowed, this system allows drones to be safely flown outside the line of sight.

The present invention solves this problem with a system comprised of a flight controller; a cellular modem; a processing board connectively configured to a drone; and a web service to link the drones and operators together; a remote control device; and one or more software modules for monitoring and controlling drone communication from a remote control device over a cellular network.

In one embodiment, a flight controller comprises a flight control board, such as an OpenPilot Revolution flight control board, or other equivalent control board as would be recognized by one skilled in the art, and a cellular data modern connected to a microprocessor. In another embodiment, a remote control device comprises an end user interface configured with software modules for controlling the drone and receiving data, wherein the data including video streaming between the drone and the remote control device, or between the drone and one or more devices such as the Oculus Rift VR headset. Remote control device is meant to include portable electronic devices configured with a processor, a user interface, input means, and communication means for connecting over a wireless network.

In yet another embodiment, the system is configured for streaming of instrumented data to multiple end users. An example would be utilizing the system to stream a video from a drone to a cloud service, which would then send the data to multiple end user devices connected to the cloud service. In one embodiment, the system is configured for AES (Advanced Encryption Standard) encrypted data streams.

In one embodiment, the system for the remote control of one or more drones consists of a remote control comprising an end user interface configured with hardware and software components; a cloud-based server for maintaining connections between the drones and one or more remote controls; hardware mounted on the drone, wherein the hardware is configured with communication means for receiving and sending commands, drone status and other data (such as instrumented data, video, images or other streaming content); and a monitoring module configured for providing a secure connection to the cloud service and configured for monitoring drones connected to the system.

The system also provides secure communications to prevent unauthorized entities from interfering with the operation of the drone, and is able to manage multiple drones and drone operators concurrently. The system is also configured for real-time monitoring of all drones comprising a connection from the drone to the cloud service, thereby enabling real-time monitoring from an end user device connected to the cloud.

In one embodiment, a secure communication and control system for one or more drones is provided comprising: a unique ID (UID) assigned to each drone on the system; an encryption/decryption key for encrypting/decrypting packet headers and data; a remote control (end user interface) configured with a security module to retrieve and store the drones UID and encryption key; a cloud-based software module for retrieving and storing the drone UIDs and the encryption keys associated with each UID; an identifier for a cloud service IP address (which can be a URL that is resolved to an IP address) for channeling a connection between the drone and the remote control.

The system is configured to support both TCP and UDP connections. The remote controls require a TCP connection, although the drone status and sensor data from the drone can use either Transmission Control Protocol (TCP) or User Datagram Protocol (UDP) connections.

In one embodiment, a drone is configured with a processor connected to a modem and a single flight controller, and any additional sensors. In one embodiment, the modem and flight controller are connected by a Universal Serial Bus (USB) connection, but any electrical interface will work providing the processor supports the connection.

In one embodiment, a drone connects to a web service using a predefined URL and port—and an encrypted header and payload data is sent and received from this connection (via the URL connection) using TCP/UDP sockets. The URL connection comprises a hostname resolved to an IP address, the IP address configured to provide data connections between the drone and cloud service—and the remote control software modules to the cloud service. In one embodiment a message header contains a drone id that uniquely identifies the connection, and the payload consists of telemetry, sensor, status and control messages or any other user defined messages—for example a message for controlling a sensor.

In one embodiment, control messages contain manual controls for the drone (yaw, pitch, roll and thrust) as well as waypoints (GPS coordinates) and various flight modes programmed as part of the flight controller (ex. A Stabilized Mode, a Landing Mode, and the like). As the drone flies outside of a line of sight, the cellular network maintains the connectivity between the controller and the drone.

In another embodiment, the remote side interface that enables the system for sending controls and viewing status and sensor data, also connects to the web service using the same URL and drone id, but using a different port—this configuration allows the sending of controls, and receiving status and telemetry of the drone.

In one embodiment, the web service is configured for monitoring drone activity by continuously receiving a message from any drones connected to the service containing the id and location (by receiving GPS coordinates) of each drone, and stores this information in a cloud server database.

In one embodiment, a monitoring mode provides means to display—on the display of a portable electronic device connected to the system—the location of system-associated drones and any other relevant information associated with a drone that is known by the system (either collected from the drone or received by user input from a remote control).

In one embodiment, the monitoring mode is configured with a port on a cloud server configured to connect the cloud server database and a drone and receive messages containing the drone ids and GPS coordinates/locations of all the drones on the system, and store any relevant information in the database. The monitoring system is also configured to display the information to the user using a mapping application (such as Google maps or any other software than can show the location of an object based on GPS coordinates), and display drone locations via the display of a user interface, such as a GUI of a portable electronic device.

In another embodiment, the monitoring mode is configured to detect a drone in a restricted air space, and to disrupt drone communication, and essentially force the drone to take a particular action by sending controls to the drone, thereby overriding control of the drone. In one embodiment, a monitoring process of the monitoring mode continually gathers drone locations and confirms the known location against a database stored in association with the monitoring mode of the cloud server. In one embodiment, the known locations of the drone are compared to the "no fly zones" (restricted locations) stored locally in the monitoring mode. The advantages in this case is relieving the drone from storing data related to no-fly zones; the no fly zones can be updated and stored in a cloud server database in one location; and can be updated in real time, even if a drone is in flight.

In another embodiment, one or more restricted areas are stored locally in the cloud database; as the database receives the location of the drones, the system can detect when a drone enters a restricted area by comparing the location of the drone (real time) against one or more restricted areas stored in the database. In one embodiment, the location of the drone is sent over a data connection from the cloud service to a monitoring module. The monitoring module can then send a warning to the remote control/end user interface, alerting the operator that they are operating the drone in a restricted space. In another embodiment, a system configured with a monitoring mode can also take control of a drone via an autopilot mode and force if to land or fly to a safe location, outside of a restricted space.

Using cellular modem data connections also allows digital controls consisting of data structures that provide more accuracy than the standard RF controls currently in use. This allows thousands of control channels for operating the drone as opposed to being limited to less than 20 using current RF controls. Specifically, using RF signals such as a PWM waveform (Pulse waveform modulation) penults only up to a few (<8) channels of data—whereas the system and method of the present invention are a significant technical improvement over this method.

In one embodiment, the system hardware consists of a processor board connected to the cellular modem and flight controller through USB connections. The processor board receives data packets from the cellular modem and processes the data and sends controls to the flight controller. Likewise, the processor receives a drone status from the flight controller through the USB connection, packages the data and sends the packet to the Cloud Service through the USB connection to the cellular modem.

In another embodiment, the system further comprises a camera that sends images back to the user using video compression techniques.

In one embodiment, the system supports multiple drones and remotes. A drone is assigned a unique ID and an encryption key from the factory; and this unique ID and encryption key may be stored on a cloud server of the system of the invention. In one embodiment, each remote connecting to the drone must know the drone id and encryption key assigned to the drone. In another embodiment, messages between the drones and remotes consist of a header message and a payload message; the header message contains the drone id and checksums of both the header and payload. In one embodiment, the drone id is sent in the clear, i.e., not encrypted. In one embodiment, when a header and message is received by ether the drone or remote, the following steps occur: the drone id is verified to be correct; the header is decrypted; the checksum for the header and payload are verified; and the payload is decrypted and processed. In another embodiment, for the cloud server, whenever a message is received from a drone the following steps occur: the drone id is verified to be valid and the encryption key is retrieved; the header is decrypted and the checksums of the header and payload are verified; if the checksums are valid, the drone is registered in a registry; the registry is checked for any remotes that are also registered and if so, the header and payload are forwarded to those remote controls. In yet another embodiment, for the remote controls, the same process occurs but the header and payload are forwarded to the drone.

Exemplary Networks

The drone and remote are also provided with a URL from the factory that provides the address of the cloud server using Domain Name Services. For example, the drone and remote know that the cloud server is located at www.mydrone1234.com. The IP address is then resolved using DNS to 10.1.10.34. The port is also assigned at the factory and using the IP address and port, a connection is then made to the cloud server using standard Berkley TCP and UDP sockets. One aspect is that servers can be switched just by changing the DNS lookup—basically registering the URL to a new server. The drone port and remote ports are different thereby permitting the cloud server to distinguish between connections from drones and connections from remotes. The system does not use a web browsers in the traditional sense (like http), rather uses the internet infrastructure to establish connections using standard network protocols. The cloud server (which is also referred to herein as a web service) is needed because URLs can't be resolved to devices connected on cellular networks.

Exemplary Registry on the Cloud

The cloud uses a registry to keep track of remotes and drones connected to the system. The registry is a map that contains one entry for each drone and multiple entries for the remotes connected to that specific drone. This allows messages to be passed between drones and remotes that share a common drone id. The drones are preprogrammed with the Web Service URL and port to thereby connect.

The registry on the Web Service provides a means to forward data to and from drones and remotes using a unique drone id and connection information. Connections and drone ids are stored in the registry and as messages are received from the drone, they're forwarded to the remotes and messages received from remotes are forwarded to the drones.

Exemplary System Overview

In one embodiment, the system comprises drone hardware of a microprocessor connected to a flight controller and cellular modem. In one embodiment, a drone is configured with a Universal Serial Bus (USB) for connecting to the cellular modem and flight controller. Any electrical connection between the flight controller or cellular modem (such as a serial port) can be used, and is adaptable depending on whether the processor has the ability to support the connection. In another embodiment, a microprocessor also has WiFi/Ethernet connections for debugging and configuring the software and hardware.

In one embodiment, the system comprises a cloud server configured as a server connected to the internet and for running cloud-based software.

In one embodiment, the system comprises a remote control, wherein the remote control comprises a device used for executing the system software modules and comprises an end user interface. This can be a computer, tablet, or phone or any other device configured with a processor and communication means capable of connecting to the internet and sending/receiving data packets to/from the cloud service for communicating with drones registered to the system.

In one embodiment, a system monitoring module comprises a processor connected to the internet to execute monitoring instructions of the module configured to retrieve status and location of the all the drones on the system and also provide a way to display the information.

In another embodiment, the system and devices include software modules that are configured to run on the drone microprocessor, and/or server (web service) and sends/receives data packets via the cellular modem. In one embodiment, drone software modules are configured to receive a data packet, verify the header and data, and decrypt the message if necessary. If the message is a flight controller message, the data is processed and sent to the flight controller. The drone software runs a separate process/thread that reads the status and telemetry of the flight controller, packages the data, possibly encrypts it and sends it to the Cloud Service using the modem connection. The software on the drone can also be configured for external sensors to provide feedback to the End User.

In another embodiment, software modules are stored and executed from the cloud-server, and can be configured to permit a drone and remote control to connect and communicate directly with each other. This is accomplished by using a UID associated with each drone provided the remote control device is provided the UID of the drone thereby enabling communication. The cloud-based software modules also maintains a database associating the UID with a encryption key for decrypting the header. When a drone connects to the cloud service an entry is made into a table with the drone's UID and connection information. Only unique drone UIDs are allowed in the table. When an remote control/end user interface connection is made an entry is placed into the remote control/end user interface table with the drone UID and connection information. The remote control/end user interface table allows multiple entries for the same drone UID but only one remote control connection can forward drone control data packets. (This allows just one remote control to control the drone—this is also a safety feature in that it prevents multiple operators/end users from sending controls to a single drone.)

Cloud-based software modules are also configured to provide a data router between the drone and End Users. Packets are received and based on the UID of the drone and the flags set in the header:

1. Cloud server checks the flags and determines if the data is encrypted, and if it is, the data is decrypted using the encryption key associated with the UID of the drone 2. The header and data checksums are calculated and once verified, the data packet can then foe forwarded 3. If the data packet is from a drone, UIDs are looked up in the remote control/end user interface table and if any entries are found, the data packets are forwarded to the remote control/end user interface processor based on the connection information stored in the table. Multiple operators can receive packets from the drone.

4. If the data packet is from an remote control, the remote control connection information is checked to make sure controls can be forwarded to the drone. The drone table is then checked and if the drone UID is found, the packet is forwarded to the drone.

5. Server checks the message id of the payload data in the header and if the data pay load contains status or location information, the payload data is processed and stored to be later downloaded by the monitoring software.

Monitor

In one embodiment, a monitor provides a server connection that sends the status on all drones connected to the cloud software. This status can include the location of each drone connected to the cloud software and thus allow drone locations to be mapped in real-time. This connection also allows the monitoring software to override the controls from the remote control and fake control of the drone such as forcing it to land. The monitoring software also allows warning messages to be sent to remote control for display on the end user interface display, if the drone enters a restricted area or for any other reason.

Remote Control Device—End User Interface Module

The End User Interface module is configured with two components:

1. The ability to send flight controls to the drone as well as commands to hardware attached to the drone in real-time 2. The ability to view or capture status or data from the drone in real-time The software requires the UID of the drone and if it uses encryption, the key as well.

The software can consist of a Graphical User Interface (GUI) for capturing controls or various GUI components for displaying status from the flight controller or data from sensors attached to the drone. The controller may also be hardware directly connected to the internet and capable of sending headers and control messages to the drone. The End User Interface software may also just be able to receive data from the drone such as streaming video or any other sensor information.

Monitoring Module

In one embodiment, the system is configured with a monitoring module comprising software that runs on a computer connected to the internet that maintains a connection with the Cloud Service. The monitoring module is configured to:

A. Receive the status of all the drones on the system including

1. The drone UID;

2. The location of the drone via collection of GPS coordinates;

3. Other status information relevant to the operation of the drone.

B. Display the location of all the drones connected to the Cloud Service

C. Store no fly zones or restricted areas and check the location of each drone relative to these zones D. The ability to send warnings to the remote control/end user interface if there is indication of improper use of drone or flying a drone into no fly zones or restricted areas E. The ability to take control of the drone or force the drone to land. This is accomplished by having the cloud server close the remote control/end user interface connection and creating another connection from the monitoring software and sending controls.

The data packets sent between the drone software and End User software consists of a header and data payload. The header consists of the following fields:

1. Drone UID

2. Flag—Depending on the value lets the system know if the header and/or payload is encrypted 3. Message ID of the data payload 4. Size of the data payload 5. Data payload checksum 6. Header checksum 7. Random bits to thwart any attempts to deconstruct the message and determine encryption key The data payload contains various control status, telemetry or any other messages that are passed between the drone and End User Software Encryption Process In one embodiment, a drone UID and header Flag is always sent in the clear (non-encrypted.) When a message is received by any of the software components, the header flag is checked to determine if the header and/or data packet is encrypted. If neither the header nor data is encrypted, the message is processed by the software and handled appropriately. If the header is encrypted, it is then decrypted so the remainder of the message can be read. The checksum for the header is then calculated. If the data packet is encrypted, the data packet is unencrypted and the data checksum is calculated. If both the calculated checksums for the header and data payload match what was sent in the header, the message is processed.

In one embodiment, the encryption works by assigning a unique key to the drone based on the drone ID. The data from the user is encrypted from the user and decrypted once in the cloud software and again on the drone. Data can be configured to be sent encrypted or in the clear. Accomplished by using unique ids assigned to each drone are encrypting headers and data to prevent unauthorized use of drone, with the Cloud service acting as a data router for unencrypting headers and verifying header and data integrity before forwarding messages.

Turning now to the Figures, which show additional details and features of the system and method of the present invention.

Figure 1:
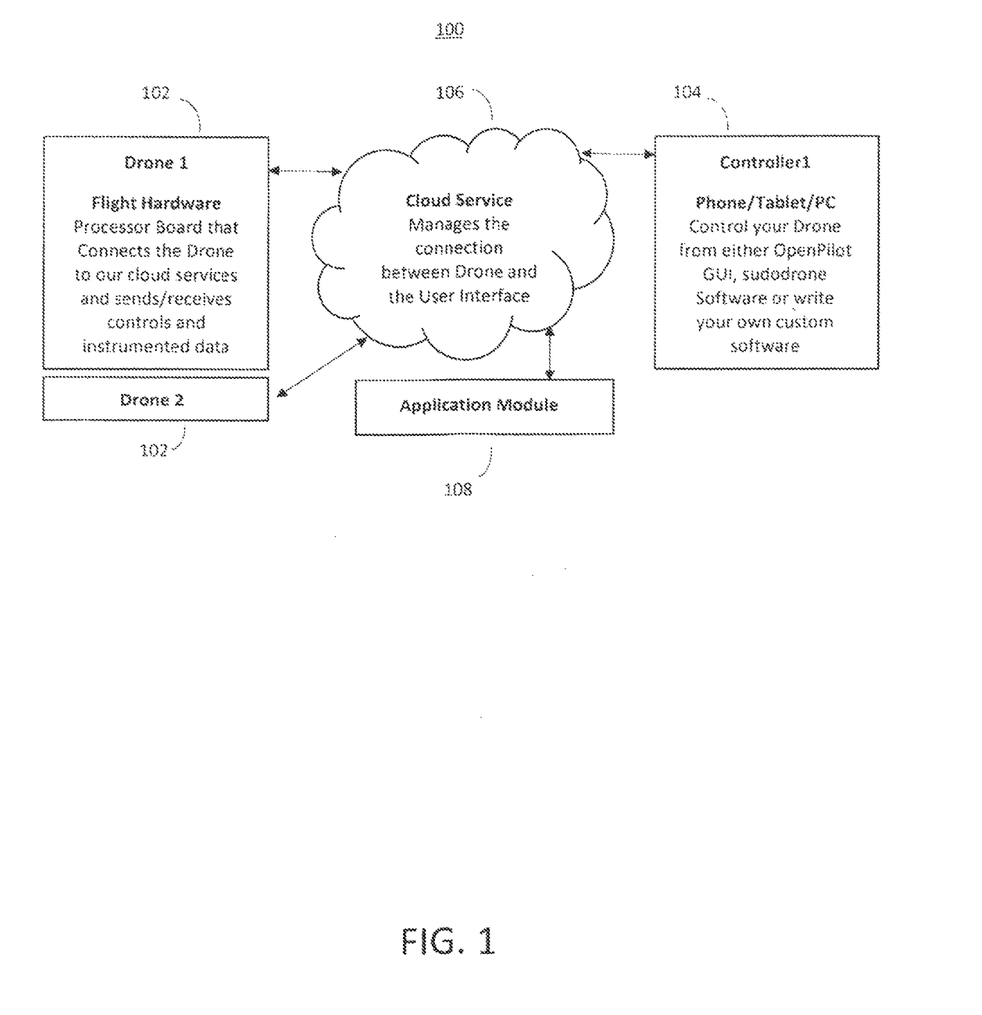
FIG. 1 shows an overview of a system for drone connectivity and communication over a cellular network, according to one embodiment of the present invention.

FIG. 1 shows system 100 comprising one or more drones 102 configured with flight hardware comprising a processing board that connects drone 102 to a cloud service and configured to send and receive data from one or more controllers 104 comprising an end user interface, wherein the end user interface comprises a graphic user interface and wherein the controller 104 is a smartphone, tablet, laptop or other portable electronic device configured as an end user interface for controlling drone 102; a cloud server 106 configured to manage connections between the drone 102 and controller 104, and wherein cloud-based server comprises one or more application modules 108 for managing communications.

Figure 2:
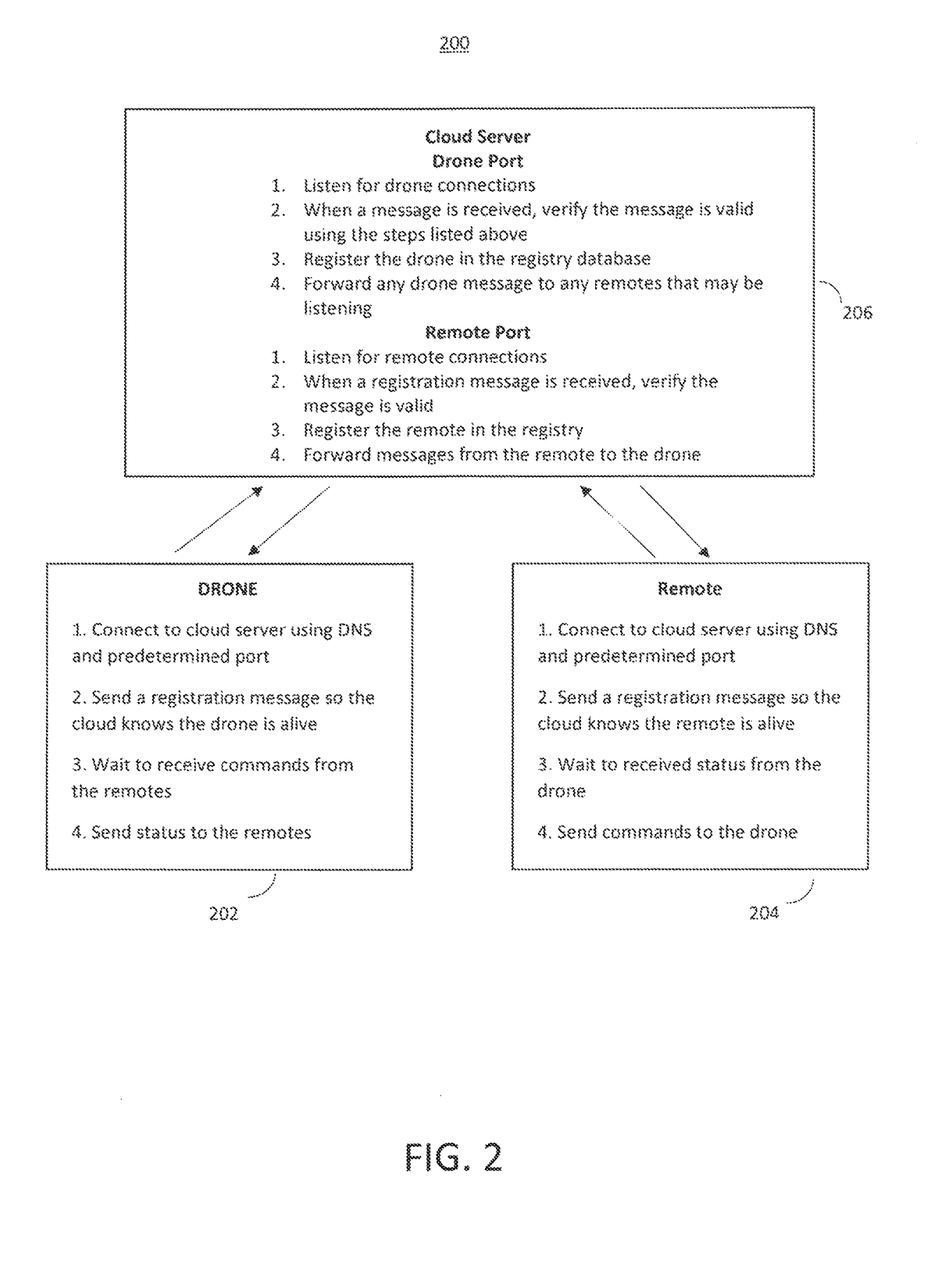
FIG. 2 shows an overview of a system and method for drone connectivity and communication over a cellular network, according to one embodiment of the invention.

FIG. 2 shows a communication configuration of the system and an overview of processing steps carried out by a system 200 for communication with a drone via a remote controller, wherein communication is carried out utilizing a cellular network. Drone 202 communication means comprising a connection cloud server 206 using DNS and a predetermined drone port. A registration message is sent from the drone to the cloud server 206, and the drone is configured to receive commands from one or more remote controllers 204. The drone is also configured to send status updates of the drone to the remote controller 204. Remote controllers are configured with communication means comprising a connection to a cloud server 206 using DNS and a predetermined remote port of the cloud server. A registration message is sent to the cloud server to open communication.

The remote 204 is configured to receive status updates from the drone 202 and to send commands to the drone 202 via the cloud server 206. Cloud server 206 is configured with a drone port, for communication with a drone 202, and a remote port, for communication with a remote controller 204. The drone port listens and detects drone connections to the server and verifies the UID of the drone in a registry database comprising an UID table/index, registers the drone in the registry database. The drone port is also configured to forward as drone message received from the drone to the cloud server (at the drone port) from the server to a remote by broadcasting a message that is received by a remote. Likewise, the remote port listens and detects remote control connections to the server and verifies remote registration messages received from the controller at the server. When a registration message is received from the remote controller, the message is verified to be valid and the remote controller is registered in the registry database. Messages received from the remote are routed to the appropriate drone via the cloud server.

Figure 3:
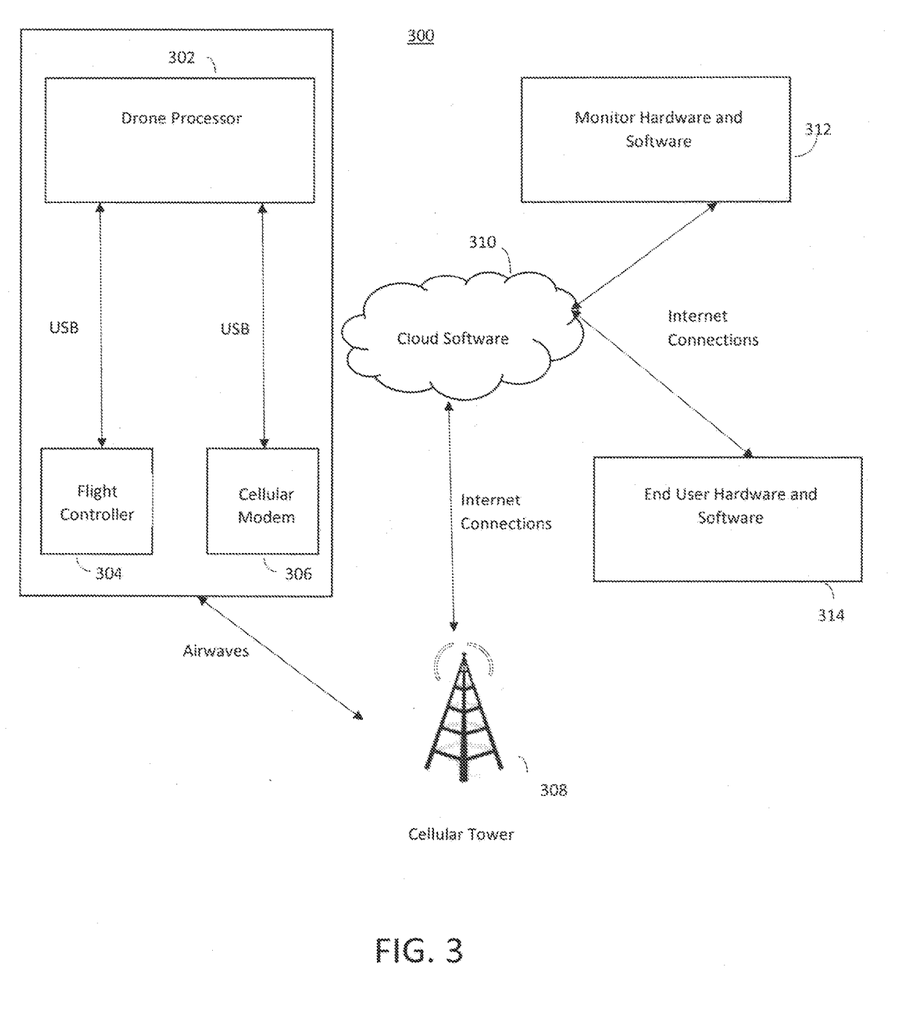
FIG. 3 shows an overview of a drone communication system and components according to one embodiment of the invention.

FIG. 3 shows a drone communication and connectivity system 300 comprising a drone processor 302 configured for a USB connection to a flight controller 304 and cellular modem 306. Cellular modem 306 communicates over a cellular network (shown as cell tower 308), which communicates with cloud-based applications 310 via internet communications. Cloud-based applications include monitoring hardware and software 312—such as a laptop, desktop or other portable electronic device configured with a display, and configured for communication with the cloud server— end user interface hardware and software 314—such as a remote control comprising a portable electronic device (including smartphones, tablets, laptop and desktop computing devices).

Figure 4:
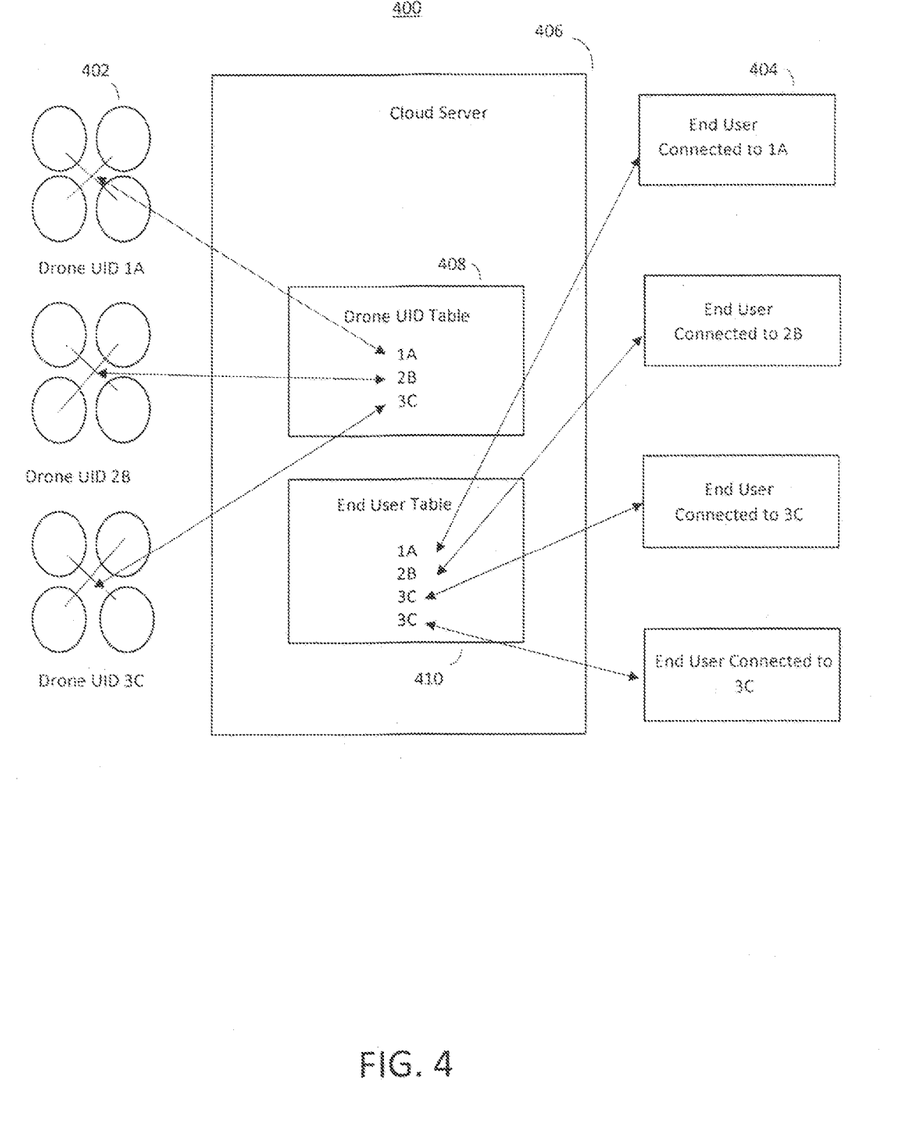
FIG. 4 shows an overview of a cloud server configured with data connection tables according to one embodiment of the invention.

FIG. 4 shows an overview of cloud server 400 configured to route data from controllers to drones via connection tables. Drone 402 shares a drone UID with controller configured as user interface 404 via a cloud-based server 406 configured with connection tables composing Drone UID table 408 for storing drone 402 identifiers, and an end user interface table 410 for storing and connecting a specific controller to a specific drone. For example, as shown in the Figure, the server configuration 400 permits a controller to connect to a specific drone based on unique identifiers.

Figure 5:
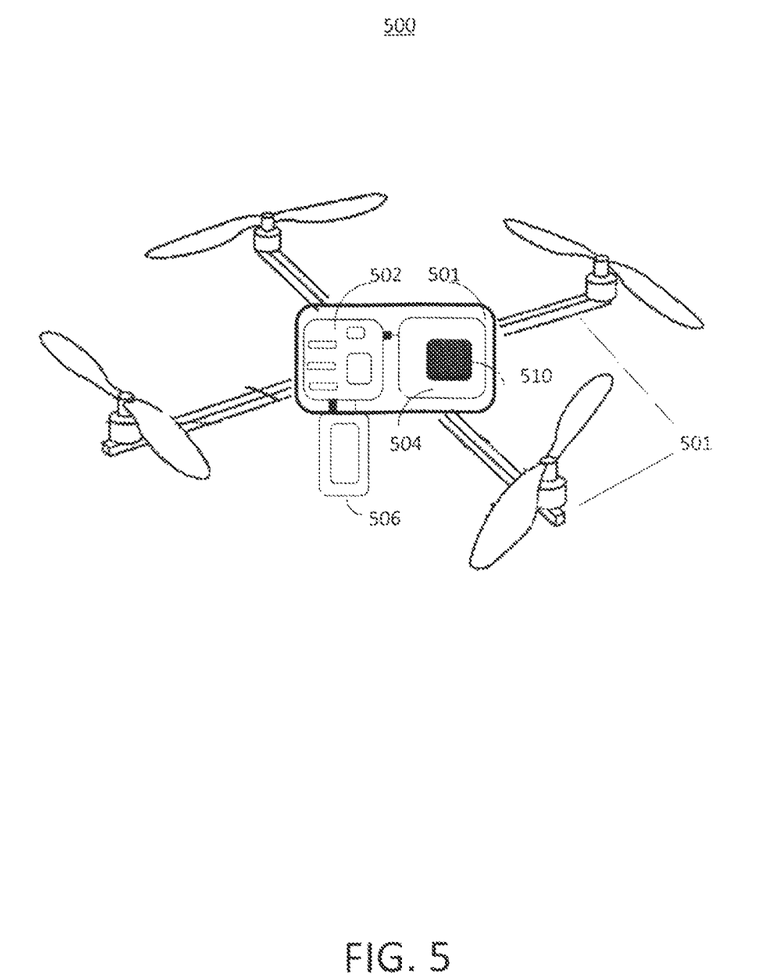
FIG. 5 shows an exemplary depletion of a drone device 600 according to one embodiment of the present invention

FIG. 5 shows an exemplary depiction of a drone device according to one embodiment of the present invention. A drone configured for communication on a cellular network 500 comprises a drone body 501 configured with a plurality of propellers, a processor board 502 attached to the drone body 501 and configured with a plurality of USB ports, a cellular modem 506 attached to the drone body 501 and connected via a USB (serial) connection to processor board 502, the modem 506 configured for communication on a cellular network to a web service configured to receive data from processing board 502, a GPS mechanism 510 attached to drone body 501 and connected to the processor board 502 through a serial connection configured for communication to a cloud server comprising a web service configured to receive GPS data, and a flight controller 504 connected to the processing board 502 via a USB (serial) connection. The drone 500 is further configured to receive data, including messages, packets and instructions to be carried out by processing board 502, from a remote control device, wherein the remote control device is a portable electronic device (smart phone, tablet, laptop) configured with a end user interface to communicate with a cloud server comprising a web service, and to send instructions for controlling or monitoring the operation of the drone 500. In this embodiment the GPS data is sent to the processor board 502 and forwarded to a cloud server and flight controller 504. In other cases, the GPS mechanism can be directly connected to the flight controller 504 and read by the processor board 502, and then forwarded to the cloud server.

It will be clear to a person skilled in the art that features described in relation to any of the embodiments described above can be applicable interchangeably between the different embodiments. The embodiments described above are examples to illustrate various features of the invention, and they are not exhaustive or exclusive.

Throughout the description and claims of this specification, the words "comprise" and "contain" and variations of them mean "including but not limited to", and they are not intended to (and do not) exclude other additives, components, materials or steps. Throughout, the singular encompasses the plural unless the context otherwise requires. In particular, where the indefinite article is used, the specification is to be understood as contemplating plurality as well as singularity, unless the context requires otherwise.

Features, materials, characteristics, described in conjunction with a particular aspect, embodiment or example of the invention are to be understood to be applicable to any other aspect, embodiment or example described herein unless incompatible therewith. The invention is not restricted to the details of any foregoing embodiments. The invention extends to any novel one, or any novel combination, of the features disclosed in ibis specification (including any accompanying claims, abstract and drawings), or to any novel one, or any novel combination, of the elements so disclosed.

The invention claimed is:

1. A method for remote connectivity and communication with a drone beyond line-of-sight via a portable electronic device, the method comprising:

sending a message comprising a drone UID from a drone configured with a processing board, a flight controller and a cellular modem, the flight controller and cellular modem connected by serial connection to the processing board to a cloud server, wherein the message is sent via a cellular network from the drone to the cloud server;

receiving the message from the drone via the cellular network to a drone port on the cloud server;

registering the drone UID of the message in a registry table on a drone database on the server;

assigning a drone ID to a portable electronic device configured as a remote control device comprising an end user interface and configured for communication with the cloud server, thereby creating a remote control to drone connection assignment;

storing the connection assignment in a remote control/end user table in the registry database;

routing messages received at the cloud server from the remote control to the assigned drone, the message sent from the cloud server via an internet connection to a cell tower;

transmitting the routed message received from the cloud server to the assigned drone over a cellular network, whereby the message is received on the drone via the cellular modem; and transmitting data comprising images, video stream gps coordinates, or commands from the drone to the cloud server over a cellular network.

2. The method of claim 1, further comprising assigning to a web service, a URL designated for the drone on the web service of the cloud server, the server configured for connection over a wireless internet connection to a monitoring device, thereby establishing a connection for remote monitoring of drone activity and drone data via the monitoring device.

3. The method of claim 1, further comprising, utilizing one or more application modules stored on one or both of the remote control device or the web server, for storing within a database one or more of no-fly zone data, and zone data; for remote monitoring and connectivity with the assigned drone of the remote control device and allowing for continual monitoring of drone traffic, and creation of no-fly zones while drones are in flight, and the ability to take control of a drone detected as entering a restricted area, and the ability to force an emergency state thereby instructing all connected drones to initiate a landing operation in order to land the drone.

4. The method of claim 1, wherein the portable electronic device is one or more of a smartphone, a tablet, a laptop, a desktop, or other computing device.

* * * * *